March 18, 1969 G. E. HUCK 3,432,914
METHOD AND APPARATUS FOR FABRICATING THIN-WALLED LARGE
DIAMETER STEEL PIPE CYLINDERS
Filed Feb. 1, 1966 Sheet 1 of 2

INVENTOR.
GEORGE E. HUCK
BY
Mason Graham
ATTORNEYS

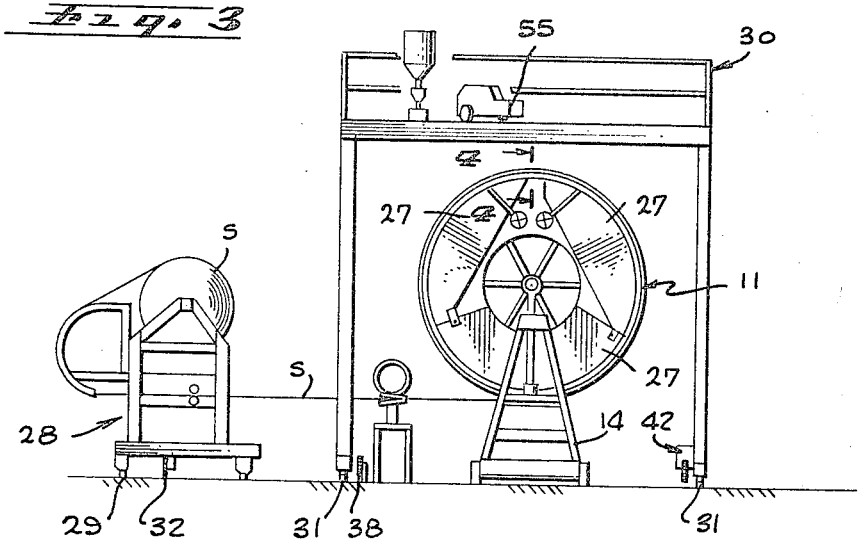
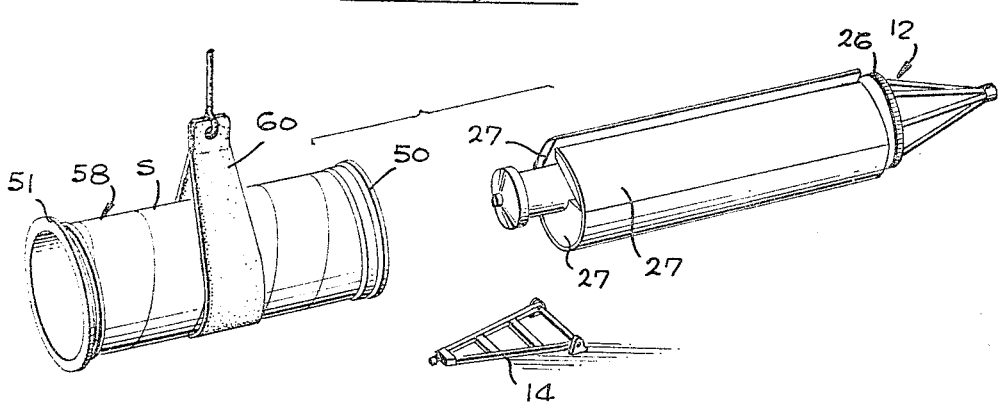
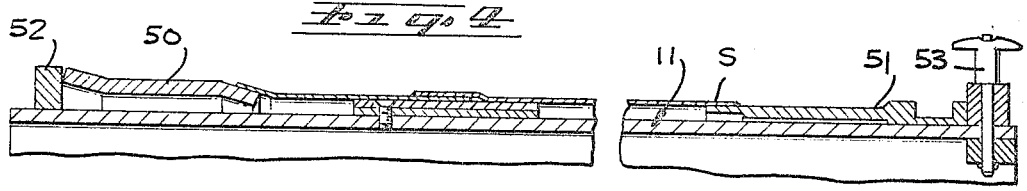
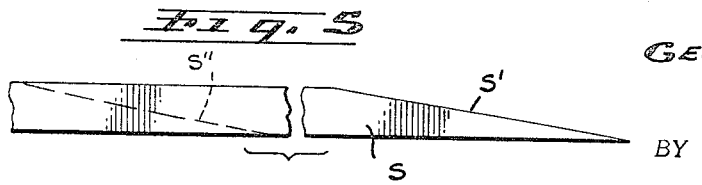

United States Patent Office 3,432,914
Patented Mar. 18, 1969

3,432,914
METHOD AND APPARATUS FOR FABRICATING THIN-WALLED LARGE DIAMETER STEEL PIPE CYLINDERS
George E. Huck, Fullerton, Calif., assignor to American Pipe and Construction Co., Monterey Park, Calif., a corporation of California
Filed Feb. 1, 1966, Ser. No. 524,018
U.S. Cl. 29—477.3
Int. Cl. B23k 31/06; F16l 9/16
9 Claims

ABSTRACT OF THE DISCLOSURE

A method of making thin-walled steel cylinders wherein steel strip is helically wound from one to another substantially rigid end ring on a collapsible drum and a welded seam formed. The application also discloses a steel strip supply and feed means and a separate welding means together with means for moving these axially of the drum in timed relation to rotation of the drum.

---

This invention has to do generally with the art of fabricating metal cylinders, and particularly with fabricating relatively thin-walled large diameter pipe cylinders used as a continuous cylindrical reinforcement member in large diameter concrete pipe.

In the manufacture of certain types of large diameter concrete pipe, a relatively thin-walled cylindrical steel shell is embedded in the pipe wall by casting the pipe around the cylinder in the mold, and such cylinders are provided at one end with a bell-type joint ring or band and at the other end with a spigot-type joint ring or band. It is customary to fabricate such reinforcement cylinders from steel sheets which have been flattened and sheared to size. These sheets are rolled into cylindrical form and a longitudinal seam formed by welding. It is then necessary to install the joint bands on the ends of the cylinder and, because of the large diameter of the cylinder, which may be several feet, and the relatively thin-walled sheet metal wall, the cylinder is not self-supporting when disposed horizontal, tending to collapse and making it difficult to handle. Consequently, each such cylinder requires a special jig to support it, and special expanding presses and considerable labor are entailed in order to mount the joint rings on the ends of the cylinder. Furthermore, great difficulty is experienced in matching the cylinder to the joint rings and in so mounting the rings that they will be in axial alignment.

An object of the present invention is to provide novel means for and method of fabricating pipe cylinders of the type described, utilizing less expensive steel and requiring less time and labor than conventional methods.

A further object is to provide a novel method and novel apparatus whereby the fabrication of the cylinder can be readily carried out and which assures axial alignment of the joint bands at the ends of the cylinder.

Another object is to provide a novel method of fabricating steel cylinders in which the joint bands are firmly held in axial alignment and the sheet metal cylinder is formed therebetween by helically winding a length of strip steel between the bands, thereby making it unnecessary to handle a cylinder without joint bands thereon and making it unnecessary to later fit the cylinder to the joint bands.

These and other objects will be apparent from the drawings and the following description. Referring to the drawings, which are diagrammatic:

FIG. 3 is an end elevational view on line 3—3 of FIG. 2;

FIG. 4 is a longitudinal fragmentary sectional view through the wall of a completed cylinder on the drum upon which it is formed on line 4—4 of FIG. 3;

FIG. 5 is a fragmentary plan view showing the way in which the steel strip is severed in the process; and FIG. 6 is a fragmentary isometric view showing the product being removed from the supporting drum on which it was fabricated.

Figure 1:
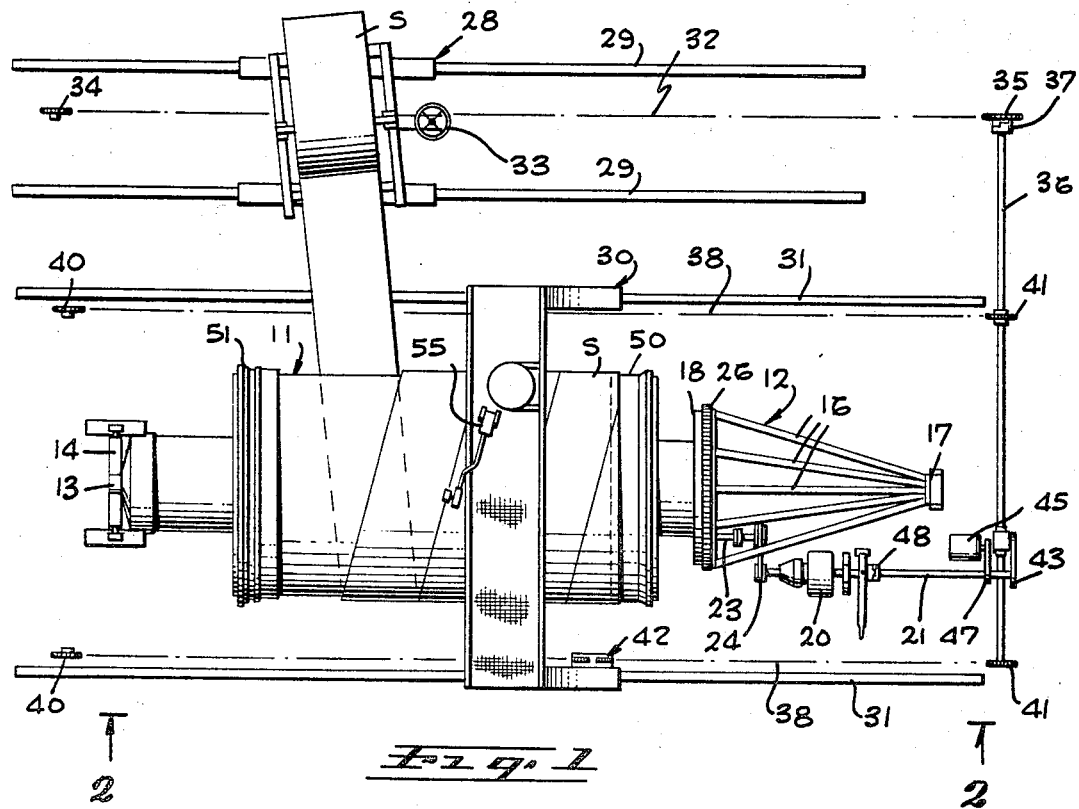
FIG. 1 is a plan view of apparatus for carrying out the invention.
Figure 2:
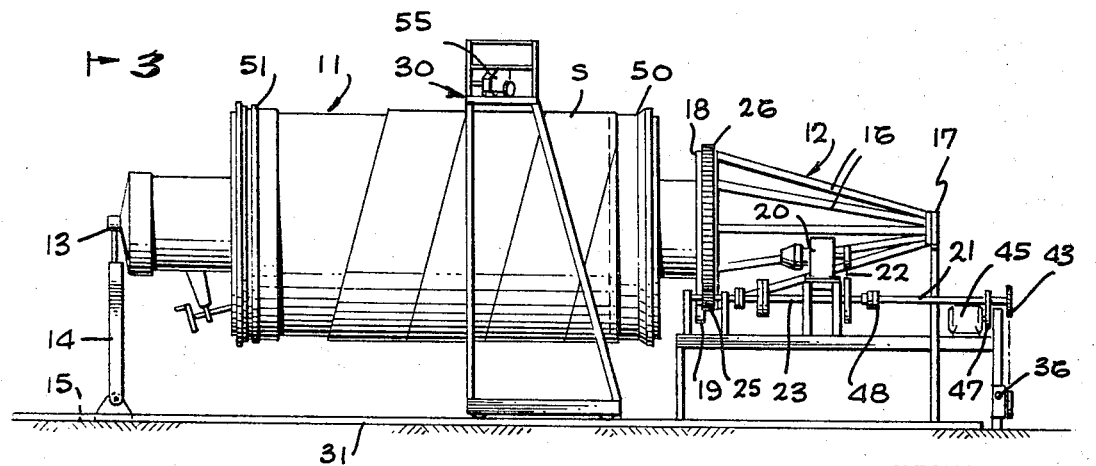
FIG. 2 is a side elevational view of the apparatus of FIG. 1 on line 2—2 of FIG. 1.

More particularly describing the invention, all the views of the drawings are diagrammatic in character since details of construction are unimportant. Reference numeral 11 generally designates a rotatable drum upon which the pipe cylinder is fabricated. This drum is supported by the structure 12 as a cantilever beam. However, a bearing 13 is provided at the other end of the drum, and this is normally supported upon a removable or demountable post 14 which is shown as pivotally mounted at its base on a suitable foundation 15. The structure 12 includes a conical openwork frame 16 rotatably supported at its outer end on a bearing 17 and having rim 18 supported on rollers 19. An electric motor 20 with suitable gear reduction means is shown connected to a shaft 21 through a chain drive 22. Shaft 21 drives a jackshaft 23 through chain drive 24. Shaft 23 carries a pinion 25 which meshes with and drives a gear 26 on the structure 12.

The drum is preferably formed of three or more segments 27 mounted in such a manner that the drum may be partially collapsed radially inward, however, since drums of this type are well known, the details of such construction are not shown.

In conjunction with the drum, I provide a carriage 28 movable along a track 29 which extends axially of the drum. This carriage is adapted to support a supply roll of steel strip designated S.

I also provide a welding equipment support, designated 30, which is shown as a gantry structure traveling on rails 31 extending axially of the drum.

The motor 20 is also used for moving the carriage 28 and the gantry 30 longitudinally of the drum in timed relation with the rotation thereof, and by way of illustration I show a chain drive for each of these means. Thus an endless chain 32 passes through a phase adjustable chain grip means 33 of any suitable type on the carriage (adapted normally to grip the chain but operable to advance or retard the carriage relative to the chain for the purpose of making adjustments) and is trained around sprockets 34 and 35, the latter being connectable to a shaft 36 by a clutch 37. Two chains 38 in spaced parallel relation are supported on sprockets 40 and 41 and a releasable chain grip means 42 is provided on gantry 30 for each chain. The two sprockets 41 are fixed on shaft 36. The latter is driven through a suitable gear and drive train means 43 which is powered by the main motor 20 and, when desired, by an auxiliary motor 45. The auxiliary motor is connected to shaft 21 by a belt drive means 47. A clutch 48 is included in shaft 21 between the two motors.

With the arrangement described, the shaft 36 can be driven independently of the main motor when clutch 48 is disengaged for the purpose of moving the gantry 30 and the carriage 28 independently of the rotation of the drum. However, it will be apparent that when the clutch 48 is engaged and the motor 20 is rotating the drum, shaft 36 will be turned in timed relation with the rotation of the drum and consequently both the carriage 28 and gantry 30 can therefore be caused to travel axially of the drum in timed relation to the speed of rotation of the drum. If desired, the gantry 28 can be released from the drive chains and thus remain stationary to provide a stationary platform for welding against band to the cylinder with a circumferential girth weld.

In carrying out the method, I first mount the two end rings or joint rings 50 and 51 upon the drum 11. This may be readily done by partially collapsing the drum and placing the rings thereon in proper spaced relation and then returning the drum to its expanded cylindrical form to hold the joint rings in place. In some cases it may be desirable to clamp the joint rings to the drum. Lugs 52 and abutment pins 53 are provided at the inner and outer ends of the drum, respectively.

With the joint rings in place I then weld the end of a length of the steel strip S to one of the end rings, preferably the one designated 50, and for this purpose the end of the strip is first preferably sheared at an angle such as to provide an end edge S' (FIG. 5) so that it will form a squared end when the strip is wound helically about the drum. The strip is then wound upon the drum from the joint ring 50 to the ring 51 and this is preferably accomplished by rotating the drum as previously described and at the same time causing the carriage 28 to travel along the track axially of the drum in timed relation thereto. The carriage is so oriented with respect to the drum and the end rings thereon that the strip will be wound at the desired helix angle. Also, any suitable means may be used on the carriage for resisting the pulling of the strip as it is wound.

While the strip is being wound on the drum, or later, if desired, a spiral seam is formed at the adjacent edges of the turns by welding with a suitable welding means 55 carried on the gantry. This welding means is advanced by the means previously described in timed relation with the rotation of the drum, except that the gantry may be disengaged from the drive chains to enable the welding of a girth seam at each end.

When the wrapping of the steel strip has progressed to the ring 51, the strip is then tack-welded to such end ring and sheared at an angle, as along the broken line S" in FIG. 5, so that the end of the cylinder as wound will also be square or normal to the axis. At this point it may be noted that in shearing the strip to form the end thereof, the same shearing operation forms the beginning end of the strip for the next winding operation. Any suitable type of joint may be formed during the welding of the seam and when the welding has been completed the post 14 is lowered and the completed pipe cylinder 58 removed from the drum, the drum being collapsed for the purpose and the cylinder being moved by means of a suitable sling 60 placed therearound and a conventional hoist or the like (not shown).

Although I have shown and described preferred forms of my invention, I contemplate that various changes and modifications can be made therein without departing from the invention, the scope of which is indicated by the following claims.

I claim:

1. The method of fabricating a relatively large diameter steel pipe cylinder with a joint band at each end which comprises the steps of providing a radially collapsible cylindrical drum; mounting a pair of joint bands on the drum in axially spaced relation, attaching the end of a strip of sheet steel to one of said joint bands, winding said strip to encompass said one band helically around said drum from said one band to and around the other band, attaching said strip to said other band, and forming a helical seam from end to end of the wound strip by welding the edge portions of each turn to those of the adjacent turns.

2. The method set forth in claim 1 in which the strip is attached to said joint bands by welding.

3. The method set forth in claim 1 in which the ends of the strip are sheared at an angle such as to provide squared ends on the wound cylinder.

4. The method set forth in claim 1 in which said drum is disposed to have its longitudinal axis horizontal, and in which the fabricated cylinder is removed from the support by radially collapsing said drum and moving the cylinder axially off one end thereof.

5. The method set forth in claim 1 in which the joint bands are chosen to be substantially rigid.

6. The method set forth in claim 1 in which said strip is wound about the drum by rotating the drum and thereby pulling the strip onto the drum and wherein tension is applied to the strip.

7. The method of fabricating a relatively large diameter, relatively thin-walled steel pipe cylinder, which comprises the steps of supporting a pair of substantially rigid joint bands in axially spaced and aligned relation, attaching the end of a strip of sheet steel to one of said joint bands by welding, winding said strip around said one band and helically in a plurality of edge adjacent turns from said one band to and around the other band, attaching said strip to said other band by welding, and forming a helical seam from end to end of the wound strip by welding the edge portions of each turn to those of the adjacent turns.

8. The method set forth in claim 7 in which said strip is sheared substantially at the end of the winding operation at an oblique angle such as to provide a squared end on the cylinder and simultaneously provide a beginning end on the strip for the winding operation of forming the next cylinder.

9. The method set forth in claim 7 in which the wound cylinder is welded at its ends to the joint bands by forming circumferential welds.

References Cited

UNITED STATES PATENTS

| | | | |
|---|---|---|---|
| 1,167,722 | 1/1916 | Scott | 29—605 X |
| 1,580,953 | 4/1926 | Bremer | 29—605 |
| 1,906,011 | 4/1933 | Naylor | 138—154 X |
| 1,943,035 | 1/1934 | Naylor | 29—477.3 X |
| 2,549,032 | 4/1951 | Taylor | 228—17 X |
| 3,323,200 | 6/1967 | McKeon et al. | 29—605 |

JOHN F. CAMPBELL, *Primary Examiner.*

J. L. CLINE, *Assistant Examiner.*

U.S. Cl. X.R.

138—154; 228—17